United States Patent [19]

Brooke, Jr.

[11] Patent Number: 4,961,771
[45] Date of Patent: Oct. 9, 1990

[54] STRESS-FREE COMPOSITE AND A METHOD OF AND ARRANGEMENT FOR MANUFACTURING THE SAME

[75] Inventor: Arthur W. Brooke, Jr., Lake Park, Fla.

[73] Assignee: United Technologies Corporation, Hartford, Conn.

[21] Appl. No.: 290,664

[22] Filed: Dec. 27, 1988

[51] Int. Cl.⁵ .............................................. C03B 19/06
[52] U.S. Cl. ...................................... 65/18.3; 65/18.1; 156/166; 156/229; 264/60
[58] Field of Search ........................ 156/229, 166, 169; 264/45.1, 56, 60; 501/32; 65/18.1, 18.3; 29/452, 527.3

[56] References Cited

U.S. PATENT DOCUMENTS 3,130,754  4/1964  Bratz ...................................... 29/452
3,787,957  1/1977  Andrews ............................... 29/452
4,809,952  3/1989  Joubert .................................. 29/452

Primary Examiner—Kenneth M. Schor
Attorney, Agent, or Firm—Peter R. Ruzek

[57] ABSTRACT

Disclosed is the manufacture of a stress-free composite including reinforcing fibers embedded in and bonded to a matrix material such that differential contraction takes place in the matrix material relative to the fibers in response to temperature decrease. It involves embedding the fibers in the matrix material at an embedding temperature to obtain a composite precursor preparatory to subsequent consolidation thereof into the composite material at a consolidation temperature, and longitudinally stretching the fibers to such an extent that the longitudinal dimension of any portion of each fiber is substantially the same as that of the contiguous portion of the matrix material both at the consolidation temperature with the fiber stretched and at a predetermined operating temperature of the composite material in the absence of such stretching. Upon consolidation, the composite material cools at least to the operating temperature and the stretching of the fibers is discontinued when the temperature of the composite material has decreased sufficiently below the consolidation temperature.

3 Claims, 1 Drawing Sheet

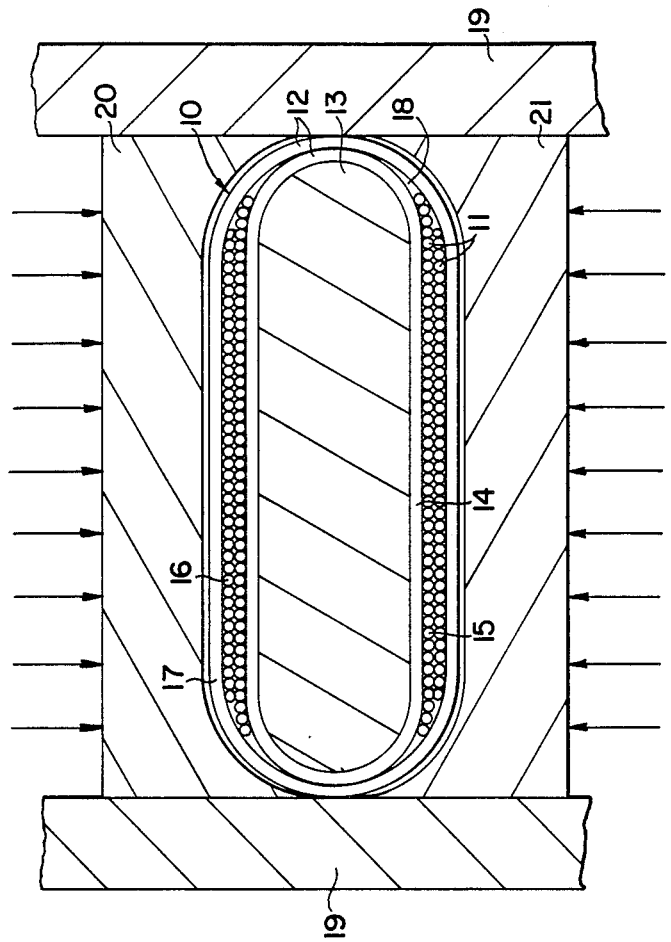

STRESS-FREE COMPOSITE AND A METHOD OF AND ARRANGEMENT FOR MANUFACTURING THE SAME

Technical Field

The present invention relates to composites in general, and more particularly to a stress-free composite and a method of and arrangement for manufacturing the same.

Background Art

There are already known various composite materials, among them so-called thermally stable composite materials which are constituted by selected kinds of glass matrices and of graphite fibers embedded in such matrices and reinforcing the same. Thermally stable composite materials of this type possess the unique combination of low weight, dimensional stability and relative ease of fabrication.

A necessary step in the manufacture of such composite materials as currently practiced is the consolidation of the composite material, which is typically achieved by applying pressure to the yet unconsolidated composite material at an elevated consolidation temperature. Experience has shown, however, that the consolidated composite material has residual stresses therein not only at room temperature, but also and more importantly, at contemplated operating temperatures, that is, the temperatures reached by the composite material when the article made of such material is in use. So, for instance, when this material is being used to make a mirror to be employed in an optical system for reflecting a high-intensity laser beam, which is one application in which such material can be used to advantage, a part of the energy of the laser beam, albeit relatively small, is absorbed by the mirror material so that the mirror material temperature rises to the operating temperature at least at the region of the mirror that reflects the laser beam, which constitutes the area of concern.

The presence of such residual stresses in the composite material is attributable to the fact that, as the consolidated composite material cools from its consolidation temperature, the glass matrix material, on the one hand, and the graphite fiber material, on the other hand, which are bonded to one another during the consolidation step, suffer different dimensional changes as they cool down because of their different coefficients of thermal expansion. The resulting stresses are tensile stresses in the glass matrix and compressive stresses in the graphite fibers.

The tensile stresses in the glass matrix are at least partially relieved by microcracking in the glass matrix. The composite material can be stabilized (i.e. stress-relieved) to some extent by subjecting it to a number of thermal cycles. During such thermal cycles, the microcracks propagate through the composite material until relative stability is achieved. However, inasmuch as many of such microcracks propagate all the way to the surface that is to constitute, or form a basis for a reflective coating ultimately presenting, the reflective surface of the mirror, their presence at this surface limits the degree to which such surface can be polished; obviously, this has the undesirable effect of impairing the optical quality of the mirror.

Accordingly, it is a general object of the present invention to avoid the disadvantages of the prior art.

More particularly, it is an object of the present invention to provide a method of manufacturing composite materials, which does not possess the disadvantages of the known methods of this kind.

Still another object of the present invention is so to develop the method of the kind here under consideration as to result in a composite material that is virtually stress-free at the operating temperature.

It is yet another object of the present invention to devise an arrangement suited for the performance of the above method.

A concomitant object of the present invention is to design the arrangement of the above type in such a manner as to be relatively simple in construction, inexpensive to manufacture, easy to use, and yet reliable in operation.

A still further object of the present invention is to present a composite material which is virtually stress-free at the operating temperature of the article made of such material, while simultaneously being substantially devoid of microcracks.

Disclosure of the Invention

In keeping with these objects and others which will become apparent hereafter, one feature of the present invention resides in a method of manufacturing a stress-free composite including reinforcing fibers embedded in and bonded to a matrix material such that differential contraction takes place in the matrix material relative to the fibers in response to temperature decrease. This method includes embedding the fibers in the matrix material at an embedding temperature to obtain a composite precursor preparatory to subsequent consolidation thereof into the composite material at a consolidation temperature, and longitudinally stretching at least some of the fibers to such an extent that the longitudinal dimension of any portion of each such fiber is substantially the same as that of the contiguous portion of the matrix material both at the consolidation temperature with the fiber stretched and at a predetermined operating temperature of the composite material in the absence of such stretching. The composite precursor is subsequently consolidated into the composite material. The thus obtained composite material then cools at least to the operating temperature, and the stretching is discontinued when the temperature of the composite material has decreased sufficiently below the consolidation temperature.

The present invention is also directed to a stress-free composite obtained by using the above method, and to an arrangement for performing this method. Advantageously, this arrangement includes a mandrel supporting the composite precursor prior to and the composite material subsequently to the consolidation, and means for attaching at least some of the fibers to the mandrel. According to the present invention, the mandrel is of a material having such a coefficient of thermal expansion that at least one dimension of the mandrel that is coextensive with the longitudinal direction of the fibers to be stretched increases to such an extent when the mandrel is heated from a temperature at which such fibers are attached thereto by the attaching means to a higher temperature at which the composite precursor is at the consolidation temperature that it stretches the fibers to the desired extent. Conversely, as the mandrel cools from the higher temperature in correspondence with cooling of the consolidated composite material from its consolidation temperature to its temperature at which the fibers are detached from the mandrel, the degree of stretching of the fibers by the mandrel gradually decreases substantially in concert with the dimensional changes (contraction) of the matrix material that attend the cooling of the composite material, thus reducing the likelihood of development of microcracks in the matrix material to a minimum.

Brief Description of the Drawing

The present invention will be described in more detail below with reference to the sole FIGURE of the accompanying drawing which is a somewhat diagrammatic cross-sectional view of an arrangement of the present invention for consolidating a composite precursor into a composite material product and for stretching the fibers embedded in the precursor at elevated temperatures.

Best Mode for Carrying Out the Invention

Referring now to the sole FIGURE of the drawing in detail, it may be seen that the reference numeral 10 has been used therein to identify a composite body which may be either an unconsolidated precursor of a composite material product, or such product itself after it has been consolidated. The body 10 includes a multitude of reinforcing fibers, such as 11 and 12. As illustrated, the reinforcing fibers 11 and 12 are supported on a mandrel 13 in four layers 14, 15, 16 and 17, with the fibers 11 of the layers 15 and 16 extending perpendicularly to, and the fibers 12 of the layers 14 and 17 extending parallel to, the plane of the drawing. The fibers 11 of the layers 15 and 16 are shown to be sandwiched between the fibers 12 of the layers 14 and 17.

The fibers 11 and 12 are preferably of graphite and they are impregnated with or otherwise embedded in a matrix material 18 which is preferably glass. The manner in which such embedding can be achieved is so well known that it need not and will not be addressed here. Suffice it to say that the matrix material 18 at least substantially fills the interstices between the fibers 11 and 12 either already in the composite precursor or in the consolidated composite material product (which may be a useful article as such or a workpiece from which at least one useful article can subsequently be made), and is bonded to the fibers 11 and 12 in the consolidated state of the product.

The drawing also depicts a support 19, and an upper part 20 and a lower part 21 of a split mold which is being used for the performance of the consolidating operation. As will be explained in some detail later, the support 19 may also be considered to be a part of means for supporting the body 10 in the mold while the consolidation operation is being performed. During such operation, pressure is applied to the two mold parts 20 and 21, as indicated by respective arrows, after the mandrel 13 with the composite body 10 thereon has been properly positioned in the mold. Prior to or during the presence of the mandrel 13 with the composite precursor then constituting the body 10 in the mold, the temperature of the material of the precursor is brought to a consolidation temperature. This may involve either heating or cooling at least the material of the precursor (with attendant commensurate increase or decrease in the temperature of the mandrel 13) if the initial temperature of the precursor material was below or above the consolidation temperature, respectively. If cooling is required, it need not be active; passive cooling due to exposure to ambient atmosphere may be sufficient in many cases.

At least the fibers 12 of the layers 14 and 17 may be tightly wound around the mandrel 13 or the underlying layers 14 to 16 at a relatively low temperature, such as the room temperature, so that the friction between the regions of the mandrel 13 and of the fibers 11 and 12 that are in contact with one another constitutes means for holding at least the fibers 12 firmly in space and thus in effect attaching at least the fibers 12 to the mandrel 13, especially if successive convolutions of the same fiber, rather than separate fiber sections, constitute the adjacent fibers 12. However, there may also be provided clamps or other attaching means of conventional construction which mechanically attach longitudinally spaced regions of at least the fibers 12 to the mandrel 13 or, for that matter, to the support 19 at a time when the body 10 is at the relatively low temperature. For the time being, it will be assumed that the attaching means attaches only the fibers 12 solely to the mandrel 13.

The mandrel 13 is of a material having a positive coefficient of thermal expansion which means that the dimensions of the mandrel 13 increase with increasing temperature. Inasmuch as the fibers 12 are attached to the mandrel 13 at the aforementioned relatively low temperature and the temperature at which the composite precursor is consolidated into the composite product into the final product is considerably higher than that, the mandrel 13 will expand as its temperature rises prior to or during the consolidation operation and thus impart equal but opposite longitudinal forces either directly or through the layers 14 and 15 to the fibers 12 due to the aforementioned direct or indirect attachment of the fibers 12 to the mandrel 13.

According to the invention, the material of the mandrel 13 is chosen in such a manner, considering the temperature rise between the attachment of the fibers 12 thereto and the consolidation operation, that the fibers 12 are stretched to such an extent at the time of the consolidation operation that, after the consolidated composite product has been cooled either actively or passively to a temperature at which the article made from the composite product is intended to be operated, the length of any portion of the respective fiber 12 in the absence of stretching thereof by the mandrel 13 is substantially the same as that of the contiguous portion of the material of the matrix 18 that is bonded to this fiber portion in the consolidated composite product. There is a wide variety of materials, most importantly metals, which are suitable for use as the mandrel material, and the selection of the proper material for the mandrel 13 is relatively straightforward, since both the coefficients of thermal expansion of such prospective mandrel materials and the extent to which the fibers 12 are to be stretched (or, in other words, the magnitudes of the equal and opposite forces that are to be applied to the fibers 12 to achieve the requisite stretching) are either known or readily ascertainable.

This approach to the manufacture of the stress-free composite reduces the formation and propagation of microcracks in the matrix material to a minimum, if not eliminating the same altogether, while simultaneously ensuring that the matrix material is virtually stress-free at the operating temperature and so is, incidentally, even the fiber material even though stress freedom of the fiber material is not that important. Moreover, if so desired, the degree of stretching of the fibers 12 may be chosen in such a manner that the equilibrium between the lengths of the affected fiber portion and the contiguous matrix material portion occurs at a temperature below the expected operating temperature, with the result that the fibers 12 will apply compressive stress to the matrix 18 even at the expected operating temperature. This further reduces the susceptibility of the matrix material to the development and propagation of microcracks therein.

The attachment of the fibers 12 to the mandrel 13 has the additional advantage that, as the mandrel temperature decreases concurrently with the cooling of the body 12 during or following the consolidation operation, the size of the mandrel 13 gradually decreases as well proportionately to the mandrel temperature decrease, so that the forces applied by the mandrel 13 through the attachment means also gradually decrease. This further reduces the likelihood of development of microcracks in the matrix material since the length of the affected fiber portion will be virtually the same as that of the contiguous matrix material portion at all times during which the fiber 12 are still attached to the mandrel 13 and the temperature of the consolidated composite product or body 10 is between the consolidation temperature and the operating temperature, inclusive. The absence of microcracks form the matrix material and particularly from the exposed matrix material surface that is to be polished if the final article is, for instance, a mirror, means that the polishability of such exposed surface is comparable to that obtaining when the article is made of the matrix material devoid of any embedded fibers.

While the sole FIGURE of the drawing illustrates the fibers 11 and 12 as being arranged in four layers 14 to 17 with a 0/90° orientation, it will be appreciated that the mandrel 13 can be easily adapted for different fiber orientations, and that the body 10 may include more or even less than the illustrated number of the fiber layers 14 to 17. Also, as already alluded to before, the fibers 11 and 12 could be attached to the support 19 instead of to the mandrel 13, in which case the heating to the consolidation temperature would have to be accomplished through the mold, or the support 19 or the non-illustrated means for attaching the fibers 12 to the support would have to be movable together and apart to impart the desired degree of stretching to the fibers 12. This approach to the stretching would also be used if the product were to be manufactured without the use of a mandrel.

It will be understood that the fibers 11 situated in the layers 15 and 16 could be, and ordinarily will be, stretched as well by using one or more of the approaches discussed above in conjunction with the stretching of the fibers 12 of the layers 14 and 17. The attachment of the fibers 11 to the mandrel 13 by convoluting them around the mandrel 13 is viable when the final product 10 can be cut at least at one region to an extent sufficient to remove the mandrel 13 from the interior of the final product 10 through the thus created opening.

While the present invention has been illustrated and described as embodied in a particular construction of an arrangement for manufacturing a stress-free composite that is particularly suited for the fabrication of composite material mirrors, it will be appreciated that the present invention is not limited to this particular example; rather, the scope of protection of the present invention is to be determined solely form the attached claims.

I claim:

1. A method of manufacturing a stress-free composite body that includes reinforcing fibers embedded in an bonded to a matrix material such that differential contraction takes place in the matrix material relative to the reinforcing fibers in response to temperature decrease, and the composite material of which is expected to reach a predetermined operating temperature after the manufacture of the composite has been completed, and the composite body is used comprising the steps of
   embedding the reinforcing fibers in the matrix material to obtain a composite precursor longitudinally stretching at least some of the reinforcing fibers;
   subsequently consolidating the composite precursor into the composite body at a consolidation temperature that is significantly higher than the predetermined operating temperature;
   causing the composite material to cool at least to the predetermined operating temperature; and
   maintaining said at least some reinforcing fibers in stretched conditions during at least said causing step and until the temperature of the composite material has decreased sufficiently below the consolidation temperature, including performing said longitudinally stretching step to such an initial extent that the longitudinal dimension of any portion of each such reinforcing fiber is at most substantially the same as that of the contiguous portion of the matrix material that is bonded to said any portion, both at the consolidation temperature with the respective reinforcing fiber stretched to said initial extent, and at the predetermined operating temperature of the composite material in the absence of such stretching.

2. The method as defined in claim 1, wherein said maintaining step includes gradually decreasing the extent of stretching of the at least some reinforcing fibers substantially proportionately to the decrease in the temperature of the composite material as the composite material cools from the consolidation temperature.

3. The method as defined in claim 2, wherein the maintaining step includes applying to each of the at least some reinforcing fibers equal but opposite longitudinal forces the magnitudes of which are proportional to the temperature of the composite material at least between the consolidation and predetermined operating temperatures.

* * * * *